United States Patent [19]

Yamada

[11] Patent Number: 4,813,397

[45] Date of Patent: Mar. 21, 1989

[54] CHARCOAL-FIRED SMOKELESS ROASTER

[75] Inventor: Takeshi Yamada, Nagoya, Japan

[73] Assignee: Sinpo Kabushiki Kaisha, Aichi, Japan

[21] Appl. No.: 144,815

[22] Filed: Jan. 15, 1988

[30] Foreign Application Priority Data

Jul. 10, 1987 [JP] Japan ................................ 62-106586

[51] Int. Cl.$^4$ ............................................. F24C 15/20
[52] U.S. Cl. .............................. 126/299 R; 126/21 A; 126/300; 126/299 D; 126/25 R; 98/115.1
[58] Field of Search ................. 126/25 R, 41 R, 21 R, 126/21 A, 299 R, 299 D, 300–303; 98/115.1, 115.3; 55/DIG. 36

[56] References Cited

U.S. PATENT DOCUMENTS

| | | | |
|---|---|---|---|
| 4,335,705 | 6/1982 | Kiyomitu | 126/299 R |
| 4,508,097 | 4/1985 | Berg | 126/21 R |
| 4,582,046 | 4/1986 | Yamada | 98/115.1 |
| 4,603,684 | 8/1986 | Kazuo et al. | 126/300 |
| 4,648,378 | 3/1987 | Nishikawa | 126/299 D |

Primary Examiner—James C. Yeung
Attorney, Agent, or Firm—Flynn, Thiel, Boutell & Tanis

[57] ABSTRACT

A charcoal-fired smokeless roaster comprising: a ventilated outer box; an inner box disposed within the outer box with a suction passage having a fixed width therebetween; a dust pan placed on the bottom of the inner box; a charcoal container placed within and supported on the inner box; a lining lining the inner surface of the charcoal container; a fire grate provided in the lower part of the charcoal container; a gridiron placed on top of the charcoal container; an air supply pipe provided so as to open into the interior of the inner box in the lower part of the same; an air supply duct connected to the outer end of the air supply pipe; a controllable blower incorporated into the air supply duct; a frame circumscribing the upper circumference of the outer box; a top plate mounted on the frame; and a vertically movable exhaust pipe receiving the lower end of the outer box therein.

3 Claims, 2 Drawing Sheets

FIG. 2

CHARCOAL-FIRED SMOKELESS ROASTER

This application is related to U.S. Ser. No. 119,815, still pending.

BACKGROUND OF THE INVENTION

1. Field of the Invention

The present invention relates to a charcoal-fired, smokeless roaster and, more specifically, the present invention relates to a charcoal-fired, smokeless roaster capable of tenderly and uniformly roasting meat by regulating the intensity of the far infrared radiation and direct heat of a charcoal fire.

2. Description of the Prior Art

Charcoal fire has been the utmost heating means for roasting meat with respect to roasting effect, appearance of roasted meat and emotional satisfaction. The conventional smokeless roaster which sucks and exhausts fumes from the roasted meat has a metallic inner case. When charcoal is placed in the metallic inner case, the inner case is subject to damage and corrosion, and the charcoal fire is liable to go out.

In roasting meat by such a conventional roaster, meat is placed on a properly slit gridiron supported over a burner. Thereafter, the meat is roasted by the hot combustion gas convecting through the slits of the gridiron and the heat conducted through the gridiron. The heat transferred to the meat by convection deprives the meat of juices and deteriorates the succulent taste and tenderness of the meat. The heat transferred to the meat by conduction roasts portions of the meat in contact with the grill to a higher degree than other portions, so that the meat is roasted irregularly.

SUMMARY OF THE INVENTION

Accordingly, it is an object of the present invention to provide a charcoal-fired, smokeless roaster capable of tenderly and uniformly roasting meat by the far infrared radiation and direct heat of a charcoal fire, and capable of exhausting fumes from the roasted meat and charcoal fire.

It is another object of the present invention to provide a durable, charcoal-fired, smokeless roaster having a charcoal container lined with a ceramic liner and provided within an inner casing, and capable of starting quickly and effectively insulating heat.

To achieve the object of the invention, the present invention provides a charcoal-fired, smokeless roaster comprising a ventilated outer box, an inner box disposed within the outer box with a suction passage having a fixed width therebetween, a dust pan placed on the bottom of the inner box, a charcoal container placed within and supported on the inner box, a ceramic lining on the inner surface of the charcoal container, a fire grate provided in the lower part of the charcoal container, a gridiron placed on top of the charcoal container, an air supply pipe provided so as to open into the interior of the inner box in the lower portion of the same; an air supply duct connected to the outer end of the air supply pipe, a controllable blower incorporated into the air supply duct, a frame circumscribing the upper circumference of the outer box, a top plate mounted on the frame, and a vertically movable exhaust pipe receiving the lower end of the outer box therein.

The charcoal-fired, smokeless roaster thus constructed roasts meat tenderly and uniformly by the controllable far infrared radiation and direct heat of a charcoal fire, and exhausts fumes and smoke from the meat and injurious gases from the charcoal fire.

Furthermore, since charcoal is placed in the charcoal container lined with the ceramic lining and placed within the inner box, the charcoal container and the inner box are protected from damage and corrosion, the charcoal burns stably, and the charcoal fire never goes out.

Thus, the charcoal-fired, smokeless roaster of the present invention is capable of uniformly roasting meat in an optimum condition without deteriorating the succulent taste and tenderness of the meat. Furthermore, the controllable blower facilitates building a charcoal fire and regulates the intensity of the charcoal fire to roast the meat properly according to a desired degree of roasting and to the thickness of the meat. Still further, the charcoal-fired, smokeless roaster can easily be diassembled to facilitate cleaning, and the removable dust pan facilitates the removal of burnt wastes and ashes.

The above and other objects, features and advantages of the present invention will become apparent from the following description taken in conjunction with the accompanying drawings.

BRIEF DESCRIPTION OF THE DRAWINGS

FIG. 2 is a fragmentary sectional view showing the essential portion of the charcoal-fired smokeless roaster of FIG. 1.

DESCRIPTION OF THE PREFERRED EMBODIMENT

Figure 1:
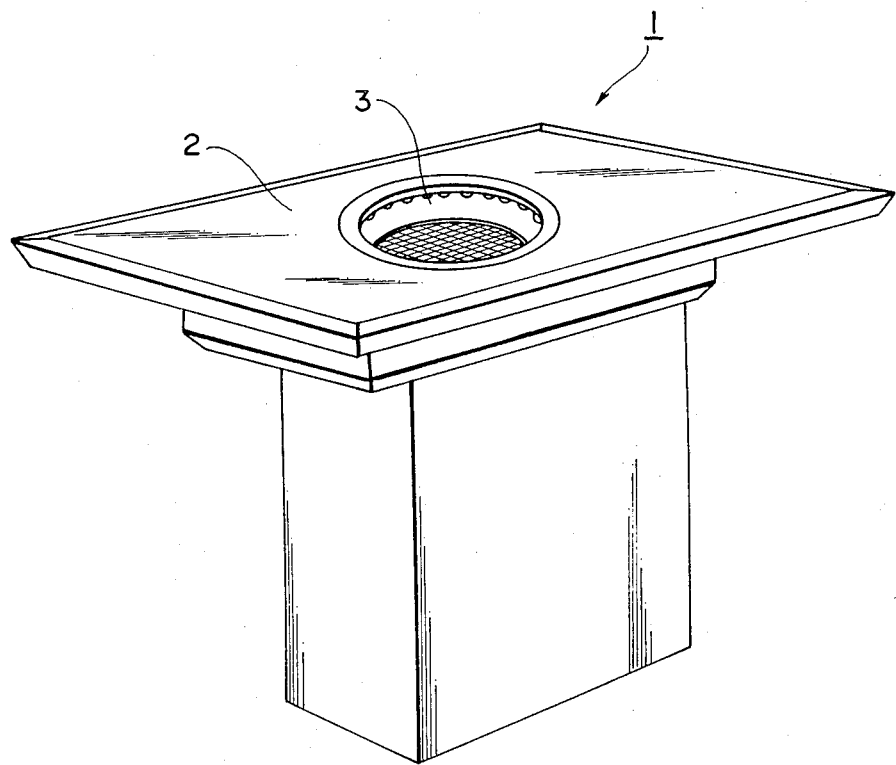
FIG. 1 is a perspective view showing the external appearance of a charcoal-fired, smokeless roaster, in a preferred embodiment, according to the present invention.
Figure 2:
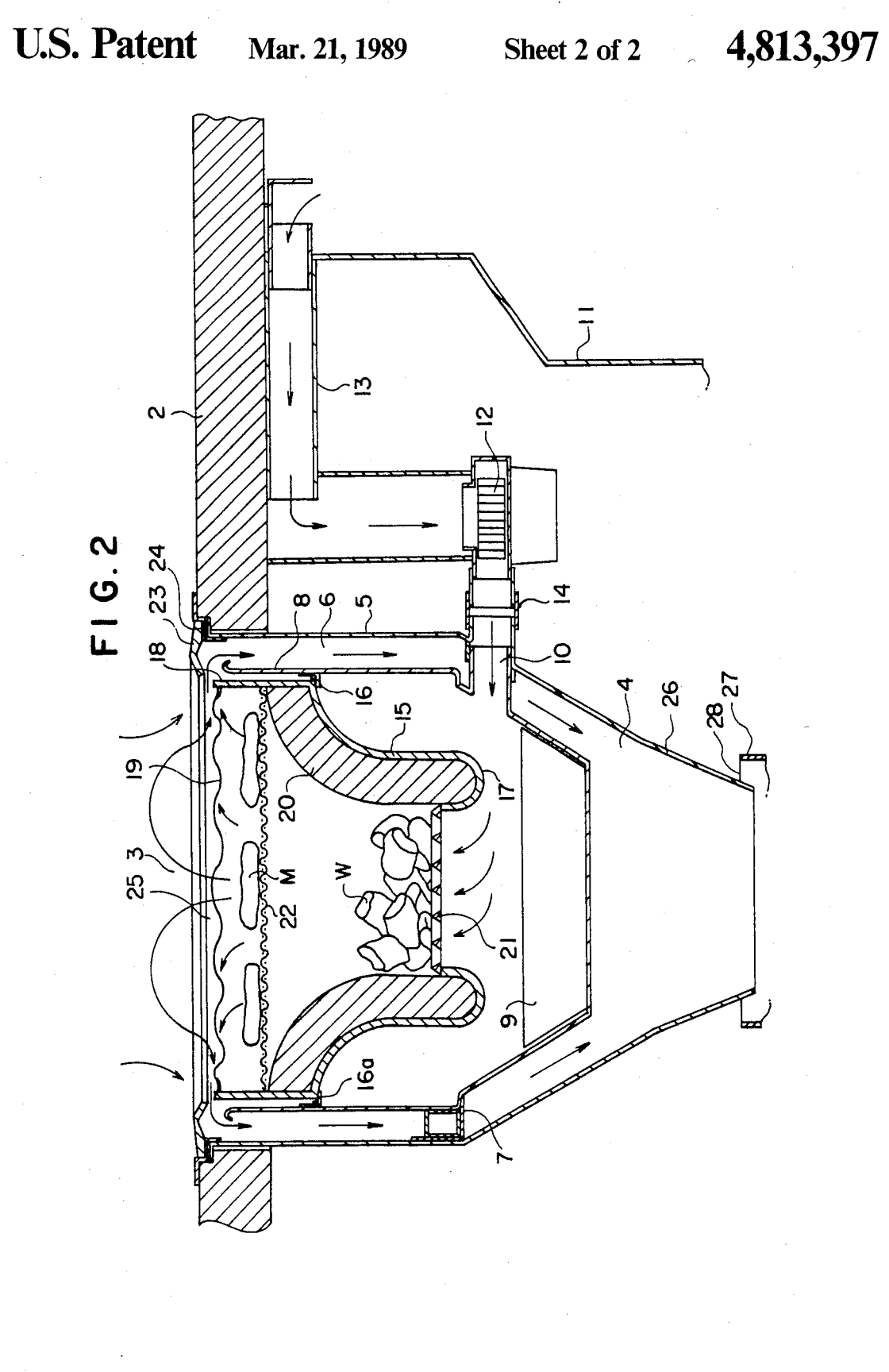

Referring to FIGS. 1 and 2, a charcoal-fired, smokeless roaster 1 has a table 2, a roasting unit 3 provided in the central section of the table 2, a generally cylindrical outer box 5 internally provided with supporting projections and connected to the table 2 at the upper end thereof and to an exhausting unit 4 including proper suction equipment, not shown, at the lower end thereof, a cylindrical inner box 8 placed within the outer box 5 on supporting projections 7 of the outer box 5 with a fixed space between the outer surface thereof and the inner surface of the outer box 5 to form a suction passage 6, a dust pan 9 detachably provided at the bottom of the inner box 8 to contain ashes of charcoal W and burnt wastes, an air supply pipe 10 having one end connected to the lower part of the inner box 8 to supply fresh air into the inner box 8 for combustion and other end penetrating through and projecting outside from the outer box 5. The outer box 5 is contained in a cabinet 11. An air supply duct 13 incorporating a controllable blower 12 and having one end opening into the exterior of the cabinet 11 and the other end joined to the air supply pipe 10 by a connecting pipe 14 is provided within the cabinet 11.

A funnel-shaped metallic charcoal container 15 is supported on lugs 16 and 16a provided on the inner box 8. The lower end of the charcoal container 15 is bent in a U shape to form a lining holding part 17 and wavy recesses 19 are formed in the upper edge of the upper cylindrical wall 18 of the same.

A funnel-shaped ceramic lining 20 is placed in the charcoal container 15. A fire grate 21 for supporting pieces of charcoal W is placed on the edge of the lining holding part 17 near the lower end of the ceramic lining 20. A gridiron or grill 22 for broiling meat M is placed on top of the ceramic lining 20.

An annular top plate 23 is placed on a frame 24 circumscribing the upper edge of the outer box 5 and resting on the brim of the opening of the table 2. Thus, an air suction space 25 is formed between the top plate 23 and the cylindrical wall 18 of the charcoal container 15.

A funnel 26 tapering toward an exhaust unit provided in the lower part of the charcoal-fired smokeless roaster 1 is received at the lower end thereof in a movable draft pipe 27 capable of vertical movement. The vertical position of the movable draft pipe 27 is adjusted so that an appropriate gap 28 is formed between the lower end of the funnel 26 and the movable pipe 27 to regulate the drafting force of the charcoal-fired, smokeless roaster 1 and reduce the temperature of the exhaust gas by introducing air through the gap 28.

The manner of operation of the charcoal-fired smokeless roaster 1 thus constructed will be described hereinafter.

Burning charcoal W is placed inside the ceramaic lining 20 on the fire grate 21. The operation of the controllable blower 12 is controlled to regulate the intensity of the charcoal fire to roast the meat placed on the grill 22 properly by the far infrared radiation and direct heat of the charcoal fire. Roasting the meat placed on the grill 22 by far infrared radiation and direct heat of the charcoal fire, as compared with heat transferred by convection and conduction, are more effective on suppressing the rapid evaporation of the juice of the meat and hence, the charcoal-fired, smokeless roaster roasts the meat uniformly in an optimum condition without deteriorating the succulent taste and tenderness of the meat.

Furthermore, since fumes and smoke are exhausted through the air suction 25 and the suction passage 6 by the suction of the exhaust unit 4, the ambient air is never spoiled by fumes and smoke.

Although the invention has been described in its preferred form with a certain degree of particularly, it is to be understood that the present invention is not limited in practical application to the specific embodiment described herein and many changes and variations are possible in the invention without departing from the scope and spirit thereof.

What is claimed is:

1. A charcoal-fired, smokeless roaster comprising:
    (a) an upper support surface extending horizontally and having an opening contained therein;
    (b) a roasting unit comprising an outer box having an opened upper end and an elongated lower end, said outer box being mounted and supported within said opening in said upper support surface by end edges thereon, an annular top plate circumscribing and supported by said end edges on said outer box, an inner box having an opened upper end and a closed lower end contained and supported in the outer box by side edges thereon, said inner and outer boxes defining a suction passage of constant width therebetween, a dust pan detachably supported within the lower end of said inner box, a charcoal container having an opened upper end contained and supported in said inner box by side edges thereon, said charcoal container additionally having an upper cylindrical wall, wavy recesses formed in an upper section of said upper cylindrical wall, a ceramic lining disposed on inside surfaces of said charcoal container, a grill supported by said ceramic lining and a bottom grate for supporting charcoal, said top plate and said upper cylindrical wall defining an air suction space therebetween;
    (c) a movable draft pipe vertically, slidably fitted on an outer surface of said outer box lower end, said movable draft pipe being capable of introducing outside air into gas exhausted from said roasting unit and regulating a suction force applied to said roasting unit;
    (d) an exhausting unit in fluid communication with said suction passage and said air suction space through said outer box lower end and said movable draft pipe;
    (e) an air supply pipe having one end in fluid communication with a lower part of said inner box and the other end projecting through and extending outside the outer box; and
    (f) an air supply duct connected to said other end of said air supply pipe by a connecting pipe, said air supply duct having a controllable blower incorporated therein for regulating the amount of outside air introduced into said inner box through said air supply pipe.

2. A charcoal-fired smokeless roaster according to claim 1, wherein the lower end of said outer box is formed in the shape of a funnel tapering toward said movable exhaust pipe.

3. A charcoal-fired smokeless roaster according to claim 1, wherein the vertical position of said movable exhaust pipe is adjustable to provide a gap appropriate for introducing fresh air therethrough into said exhaust pipe between the lower end of said outer box and said exhaust pipe.

* * * * *